(12) United States Patent
Shin et al.

(10) Patent No.: US 8,047,061 B2
(45) Date of Patent: Nov. 1, 2011

(54) METHOD AND APPARATUS FOR REAL-TIME ESTIMATION OF FOUR WHEEL IMBALANCES FOR CHASSIS PROGNOSIS

(75) Inventors: Kwang-Keun Shin, Rochester Hills, MI (US); Hong S. Bae, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 385 days.

(21) Appl. No.: 12/466,796

(22) Filed: May 15, 2009

(65) Prior Publication Data

US 2010/0288030 A1 Nov. 18, 2010

(51) Int. Cl.
*G01M 1/00* (2006.01)
(52) U.S. Cl. .......................................................... 73/66
(58) Field of Classification Search ............. 73/462, 73/460, 473, 66; 301/5.21; 701/42
See application file for complete search history.

(56) References Cited

U.S. PATENT DOCUMENTS 5,025,662 A * 6/1991 Hultberg ........................ 73/459
6,244,108 B1 * 6/2001 McInnes et al. ................ 73/462

* cited by examiner

*Primary Examiner* — Jewel V Thompson
(74) *Attorney, Agent, or Firm* — John A. Miller; Miller IP Group, PLC

(57) ABSTRACT

A system and method for determining whether a particular wheel on a vehicle is un-balanced during operation of the vehicle. The method includes providing wheel angle signals from the wheels of the vehicle and providing a vibration measurement signal from a response point on the vehicle, such as from an accelerometer on a steering column of the vehicle. The method also includes generating a regression vector using the wheel angle signals. The method also includes generating an estimated parameter vector using a recursive least squares algorithm, the regression vector and the vibration measurement signal. The method then calculates an imbalanced magnitude value of each wheel of the vehicle using the estimated parameter vector. The method uses a persistency of excitation test to determine whether the parameter vector has converged to a true value to determine whether the calculated imbalanced magnitude values are accurate.

20 Claims, 3 Drawing Sheets

US 8,047,061 B2

METHOD AND APPARATUS FOR REAL-TIME ESTIMATION OF FOUR WHEEL IMBALANCES FOR CHASSIS PROGNOSIS

BACKGROUND OF THE INVENTION

1. Field of the Invention

This invention relates generally to a system and method for determining vehicle wheel imbalance and, more particularly, to a system and method for determining that a particular wheel of a vehicle is out of balance using wheel angle signals from the wheels and a vibration measurement at a response point on the vehicle that includes calculating a recursive least squares solution from the wheel angle signals and the vibration measurements.

2. Discussion of the Related Art

Wheel imbalance is a common problem that owners of a vehicle often experience. Wheel imbalance usually manifests itself through vibrations at the steering wheel, which become more pronounced at higher vehicle speeds. There are many causes for wheel imbalance and associated vibrations at the steering wheel. For example, the wheels and/or tires may have developed defects over time. Also, imbalances could occur from denting the wheel by hitting a curb, which may change the wheel's physical dimensions, and therefore, destroy the symmetry of the wheel that would result in vibrations. Further, wheel imbalance induced vibrations is one of the major causes of failure or degradation of vehicle chassis systems, such as steering and suspension. Thus, left untreated, wheel imbalance may lead to excessive degradation of chassis components, such as bearings, bushings, etc.

When a customer services a vehicle wheel imbalance problem, typically only the presence of the vibration is communicated to the service personnel. A technician then has to remove each wheel of the vehicle, mount it on a wheel balance machine, and make necessary adjustment to quell rotational imbalance. This process of "hunting" for the suspect wheel location that causes the imbalance presents an opportunity. If the location of wheel imbalance (e.g., left front vs. right rear wheels) could be identified in advance, it would save time currently used in locating the suspect wheel, which would reduce the warranty cost dramatically. Moreover, detecting imbalances during vehicle operation, and re-balancing the wheel at an early stage can prevent the propagation of harmful vibration to other chassis components. This will reduce chassis component failure and associated warranty costs.

SUMMARY OF THE INVENTION

In accordance with the teachings of the present invention, a system and method are disclosed for determining whether a particular wheel on a vehicle is un-balanced during operation of the vehicle. The method includes providing wheel angle signals from the wheels of the vehicle and providing a vibration measurement signal from a response point on the vehicle, such as from an accelerometer on a steering column of the vehicle. The method also includes generating a regression vector using the wheel angle signals. The method also includes generating an estimated parameter vector using a recursive least squares algorithm, the regression vector and the vibration measurement signal. The method then calculates an imbalanced magnitude value of each wheel of the vehicle using the estimated parameter vector. The method uses a persistency of excitation test to determine whether the parameter vector has converged to a true value to determine whether the calculated imbalanced magnitude values are accurate.

Additional features of the present invention will become apparent from the following description and appended claims, taken in conjunction with the accompanying drawings.

BRIEF DESCRIPTION OF THE DRAWINGS

FIG. 5 is a block diagram of a persistency of excitation determination processor in the estimation system shown in FIG. 3.

DETAILED DESCRIPTION OF THE EMBODIMENTS

The following discussion of the embodiments of the invention directed to a system and method for identifying wheel imbalance of a particular vehicle wheel during operation of the vehicle is merely exemplary in nature and is in no way intended to limit the invention or its application or uses.

Figure 1:
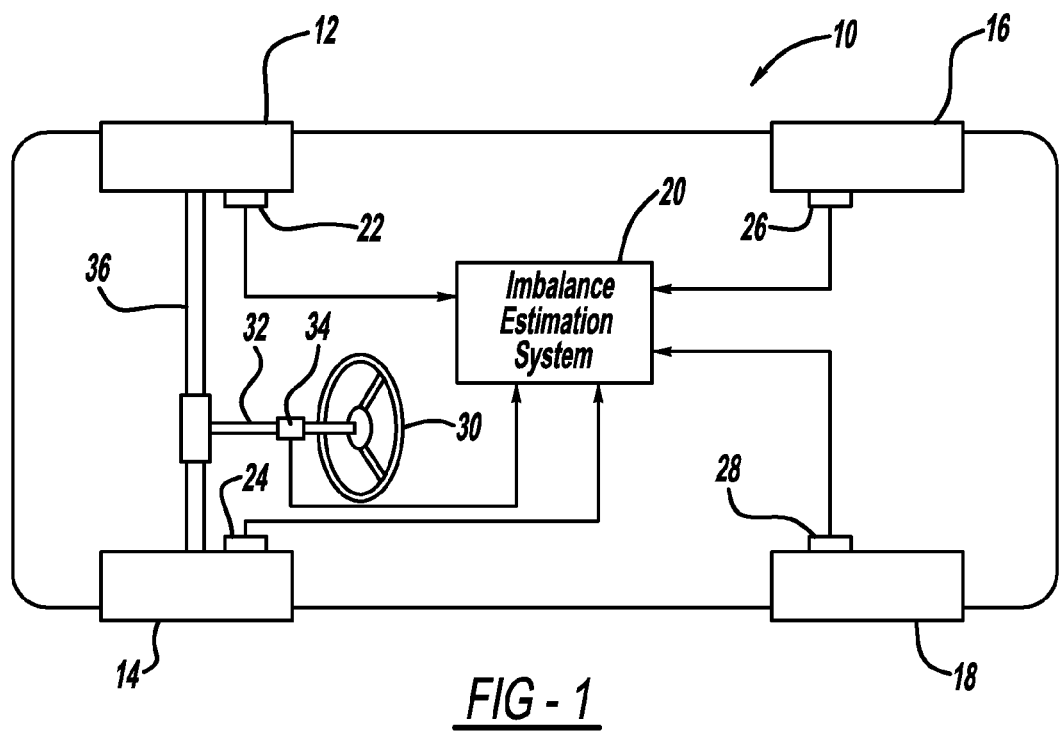
FIG. 1 is an illustration of a vehicle including a wheel imbalance estimation system for determining whether a particular wheel on the vehicle is out of balance.

FIG. 1 is an illustration of a vehicle 10 including front wheels 12 and 14 and rear wheels 16 and 18. The vehicle 10 also includes a wheel imbalance estimation system 20 that determines whether any of the wheels 12, 14, 16 or 18 is out of balance, and if so, which one, as will be discussed in detail below. The wheels 12, 14, 16 and 18 include an antilock braking system (ABS) 22, 24, 26 and 28, respectively, of the type known in the art. Each of the ABSs 22, 24, 26 and 28 is able to provide a signal identifying the wheel angle for the particular wheel, which is provided to the imbalance estimation system 20. The vehicle 10 also includes a steering wheel 30 for steering the front wheels 12 and 14 through a steering column 32 and a front axle 36. An accelerometer 34 is provided on the steering column 32 and is able to measure the vibrations of the steering wheel 30. Vibration signals from the accelerometer 34 are also provided to the imbalance estimation system 20. The vibration sensor does not have to be an accelerometer, but can be any suitable sensor, for example, a steering wheel torque sensor, which is available in vehicles equipped with electrical power steering.

The imbalance estimation algorithm estimates the four wheel imbalances and outputs magnitudes of the imbalances of each wheel 12, 14, 16 and 18. The system 20 also outputs an estimation ready flag indicating that the excitation has been sufficient for imbalance estimation, and the imbalance estimation results can be used with confidence.

Figure 2:
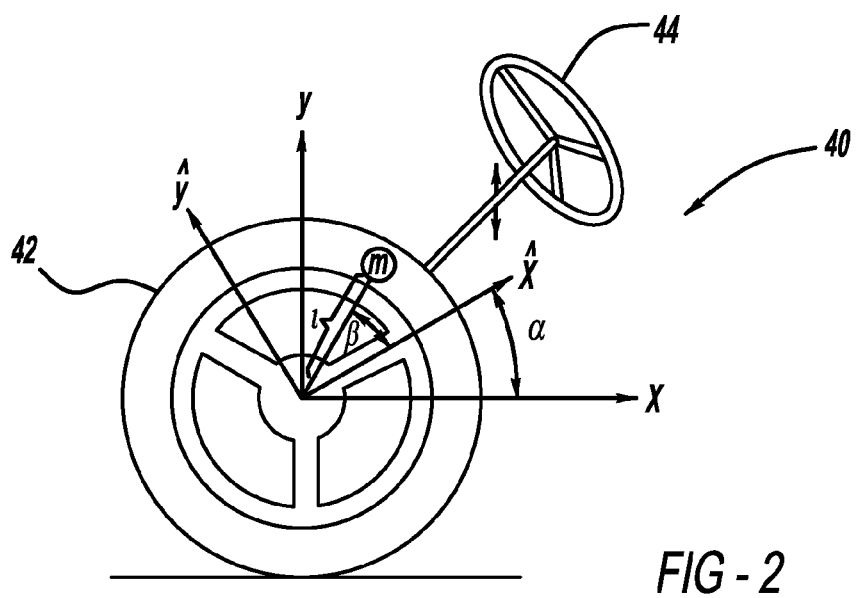
FIG. 2 is an illustration of a vehicle wheel and steering wheel showing parameters for modeling a vibration induced at a reference point from wheel imbalance.

The discussion below uses a mathematical model and estimation algorithm to determine wheel imbalance. FIG. 2 is an illustration 40 of a wheel 42 being steered by a steering wheel 44 showing variables and parameters used in the model. To provide the mathematical model and estimation algorithm, coordinate systems need to be defined. The coordinate system (x,y) is attached to the vehicle 10 and the coordinate system $(\hat{x},\hat{y})$ is attached to the wheel 42. The $\hat{x}$ coordinate may be aligned with the line between the center of the wheel 42 and the wheel valve stem, but any line can be chosen from the center of the wheel 42 to a fixed point on the wheel 42 without loss of generality. The wheel 42 rotates as the vehicle moves and the coordinate system $(\hat{x},\hat{y})$ rotates with respect to the coordinate system (x,y). The rotation angle between the two coordinate systems is denoted as $\alpha$.

The imbalance of the wheel 42 is modeled, where m is the imbalance mass and l is the imbalance offset distance from the rotational center of the wheel 42. The location of the imbalance $\vec{r}$ with respect to the body coordinate system (x,y) is denoted as:

$$\vec{r} = l\{\cos(\alpha+\beta)x + \sin(\alpha+\beta)y\} \quad (1)$$

The imbalance force transmitted to the axle 36 is then derived from Newton's second law as:

$$\vec{f} = f_H x + f_V y = m\ddot{\vec{r}} = -\omega^2 ml \cos(\alpha+\beta)x - \omega^2 ml \sin(\alpha+\beta)y \quad (2)$$

Where, $\omega = d\alpha/dt$ is wheel speed, and $f_H$ and $f_V$ are horizontal and vertical forces, respectively.

The horizontal and vertical imbalance forces in equation (2) can be re-written in complex for as:

$$f_H = Re[-\omega^2 ml e^{j(\alpha+\beta)}] \text{ and } f_V = Re[j\omega^2 ml e^{j(\alpha+\beta)}] \quad (3)$$

Where, $e^{j(\alpha+\beta)} = \cos(\alpha+\beta) + j\sin(\alpha+\beta)$ and $j = \sqrt{-1}$.

The imbalance induced vibration on a response point of the vehicle body, for example, and the acceleration measured on the steering column 32 contribute to both horizontal and vertical imbalance forces. If $H_H(j\omega)$ and $H_V(j\omega)$ are denoted to be the transfer function from the horizontal and vertical imbalance forces to the vibration measurement (acceleration or torque measurement) at the response point, respectively, then the vibration measurement at the response point is denoted as:

$$v(t) = Re[-\omega^2 H_H(j\omega) ml e^{j(\alpha+\beta)}] + Re[j\omega^2 H_V(j\omega) ml e^{j(\alpha+\beta)}]$$
$$= Re[\{-\omega^2 H_H(j\omega) + j\omega^2 H_V(j\omega)\}(ml e^{j\beta})e^{j\alpha}] \quad (4)$$

For notational simplicity, the imbalance transfer function $G(j\omega)$ can be defined as:

$$G(j\omega) = -\omega^2 H_H(j\omega) + j\omega^2 H_V(j\omega) \quad (5)$$

Since the parameters m, l and $\beta$ are all constants, the term $(ml e^{j\beta})$ in equation (4) can be replaced by a complex number u, which is imbalance in a complex phasor form as:

$$u = a + jb = ml e^{j\beta} \quad (6)$$

Equation (4) can then be simplified as:

$$v(t) = Re[G(j\omega)u e^{j\alpha}] = \frac{1}{2}[G(j\omega)u e^{j\alpha} + G(-j\omega)\bar{u} e^{-j\alpha}] \quad (7)$$

Since $u = a + jb$ and $\bar{u} = a - jb$, equation (7) can be re-written as:

$$v(t) = \frac{1}{2}[G(j\omega)(a+jb)e^{j\alpha} + G(-j\omega)(a-jb)e^{-j\alpha}]$$
$$= \frac{1}{2}[G(j\omega)e^{j\alpha} + G(-j\omega)e^{-j\alpha}]a +$$
$$\frac{1}{2}[jG(j\omega)e^{j\alpha} - jG(-j\omega)e^{-j\alpha}]$$
$$= Re[G(j\omega)e^{j\alpha}]a - Im[G(j\omega)e^{j\alpha}]b \quad (8)$$

Equation (8) is the vibration measurement at the response point provided by one wheel. Since there are four wheels on a vehicle, the net vibration is calculated by superposing the contributions of all four wheels as:

$$v(t) = Re[G_{LF}(j\omega_{LF})e^{j\alpha_{LF}}]a_{LF} - Im[G_{LF}(j\omega_{LF})e^{j\alpha_{LF}}]b_{LF} + \quad (9)$$
$$Re[G_{RF}(j\omega_{RF})e^{j\alpha_{RF}}]a_{RF} - Im[G_{RF}(j\omega_{RF})e^{j\alpha_{RF}}]b_{RF} +$$
$$Re[G_{LR}(j\omega_{LR})e^{j\alpha_{LR}}]a_{LR} - Im[G_{LR}(j\omega_{LR})e^{j\alpha_{LR}}]b_{LR} +$$
$$Re[G_{RR}(j\omega_{RR})e^{j\alpha_{RR}}]a_{RR} - Im[G_{RR}(j\omega_{RR})e^{j\alpha_{RR}}]b_{RR}$$

Where the subscripts LF, RF, LR and RR denotes left front, right front, left rear, and right rear, respectively.

The imbalance transfer functions are obtained off-line by testing a real vehicle. For example, the imbalance transfer function $G_{LF}(j\omega_{LF})$ is obtained by using a known weight to imbalance to the left front wheel and measuring the vibration at the response point for different speeds.

The problem of imbalance estimation is equivalent to finding eight parameters, namely, $a_{LF}$, $b_{LF}$, $a_{RF}$, $b_{RF}$, $a_{LR}$, $b_{LR}$, $a_{RR}$ and $b_{RR}$ from the vibration measurement v(t). Given that all the imbalance transfer functions are known a priori, equation (9) is a linear-in-parameter form. Therefore, equation (9) can be written in a linear regression form as:

$$y_o(t) = \phi^T(t)\theta_o \quad (10)$$

Where, $$y_o(t) = v(t) \quad (11)$$

$$\phi^T(t) = \begin{Bmatrix} Re[G_{LF}(j\omega_{LF})e^{j\alpha_{LF}}] \\ -Im[G_{LF}(j\omega_{LF})e^{j\alpha_{LF}}] \\ Re[G_{RF}(j\omega_{RF})e^{j\alpha_{RF}}] \\ -Im[G_{RF}(j\omega_{RF})e^{j\alpha_{RF}}] \\ Re[G_{LR}(j\omega_{LR})e^{j\alpha_{LR}}] \\ -Im[G_{LR}(j\omega_{LR})e^{j\alpha_{LR}}] \\ Re[G_{RR}(j\omega_{RR})e^{j\alpha_{RR}}] \\ -Im[G_{RR}(j\omega_{RR})e^{j\alpha_{RR}}] \end{Bmatrix} \quad (12)$$

$$\theta_o = \{a_{LF} b_{LF} a_{RF} b_{RF} a_{LR} b_{LR} a_{RR} b_{RR}\}^T \quad (13)$$

In equations (10), (12) and (13), $\phi(t)$ and $\theta_0$ are a regression vector and a parameter vector, respectively. The parameter vector $\theta_o$ can be estimated using a recursive least squares (RLS) algorithm that minimizes the following cost function:

$$J_o(k) = \Sigma_{l=0}^{k} \lambda^l \{y_o(k-l) - \phi^T(k-l)\hat{\theta}_o(k)\}^2 \quad (14)$$

Where, $y_o(0) = \phi^T(0) = 0$.

The cost function of equation (14) can be re-written by adding and subtracting $\phi^T(k-l)\hat{\theta}_o(0)$ inside the summation, where $\hat{\theta}_o(0)$ is the initial estimation of the parameter as:

$$J_o(k) = \Sigma_{l=0}^{k} \lambda^l \{y_o(k-l) - \phi^T(k-l)\hat{\theta}_o(0) - \phi^T(k-l)(\hat{\theta}_o(k) - \hat{\theta}_o(0))\}^2 \quad (15)$$

The least squares solution $\hat{\theta}_0(k)$ that minimizes the cost function of equation (15) then can be found as:

$$\hat{\theta}_o(k) - \hat{\theta}_o(0) = P(k)(\Sigma_{l=0}^{k} \lambda^l \phi(k-l)\{y_o(k-l) - \phi^T(k-l)\hat{\theta}_o(0)\}) \quad (16)$$

And:

$$P(k) = (\Sigma_{l=0}^{k} \lambda^l \phi^T(k-l)\phi^T(k-l) + \lambda^k P^{-1}(0))^{-1} \quad (17)$$

Where P is a co-variance and $\lambda$ is a forgetting factor. The forgetting factor determines exponentially decaying windows of the data and is generally chosen to be close to, but less than one.

The recursive form of equation (17) can then be written as:

$$P(k) = \frac{1}{\lambda}\left[P(k-1) - \frac{P(k-1)\varphi(k)\varphi^T(k)P(k-1)}{\lambda + \varphi^T(k)P(k-1)\varphi(k)}\right] \quad (18)$$

And the recursive from of equation (16) is then written as:

$$\hat{\theta}_o(k) - \hat{\theta}_o(0) = \hat{\theta}_o(k-1) - \hat{\theta}_o(0) + \quad (19)$$
$$P(k)\varphi(k)\{y_o(k) - \varphi^T(k)\hat{\theta}_o(0) - \varphi^T(k)(\hat{\theta}_o(k-1) - \hat{\theta}_o(0))\}$$

Equation (19) can be further reduced to:

$$\hat{\theta}_o(k) = \hat{\theta}_o(k-1) + P(k)\phi(k)\{y_o(k) - \phi^T(k)\hat{\theta}_o(k-1)\} \quad (20)$$

Equations (18) and (20) are a recursive least squares algorithm with exponential forgetting, and equation (20) is nothing but a recursive form of equation (16).

Once the parameter vector $\theta_o$ has been estimated, the imbalance magnitude value û of each wheel 12, 14, 16 and 18 is extracted from the estimation of the parameter vector $\hat{\theta}_o$ as:

$$|\hat{u}_{LF}| = \sqrt{\hat{a}_{LF}^2 + \hat{b}_{LF}^2} \quad (21\text{-}1)$$

$$|\hat{u}_{RF}| = \sqrt{\hat{a}_{RF}^2 + \hat{b}_{RF}^2} \quad (21\text{-}2)$$

$$|\hat{u}_{LR}| = \sqrt{\hat{a}_{LR}^2 + \hat{b}_{LR}^2} \quad (21\text{-}3)$$

$$|\hat{u}_{RR}| = \sqrt{\hat{a}_{RR}^2 + \hat{b}_{RR}^2} \quad (21\text{-}4)$$

Where, $\theta_o = \{\hat{a}_{LF}\ \hat{b}_{LF}\ \hat{a}_{RF}\ \hat{b}_{RF}\ \hat{a}_{LR}\ \hat{b}_{LR}\ \hat{a}_{RR}\ \hat{b}_{RR}\}$.

The phase of the imbalance also can be calculated from the estimated parameters. However, the phase is not of interest and the phase calculation is omitted here.

During the estimation process, it is not known if the estimated parameters (imbalances) have actually converged to the true value because the true value is not known. Therefore, a method to test the convergence of the parameters in real-time is needed.

The convergence of the parameter estimation depends on the persistency of excitation (PE) of the regression vector $\phi(t)$. The PE of the imbalance estimation is poor if the vehicle speed is constant on a straight road because each wheel is excited at the same frequency and the vibration contribution of each wheel is hardly distinguishable. For a rich PE, therefore, the vehicle should be driven at various speeds. Also, the PE can be further improved during turning because the right and left wheels are excited by slightly different frequencies. In theory, the convergence of the parameter estimation can be guaranteed by specifying a driving schedule with a rich PE. In a real driving situation, however, the driving schedule cannot be specified. Therefore, the PE should be monitored in real-time and the estimated imbalance should be used after confirming a rich PE.

One way to confirm the PE condition is to check the condition number of the covariance matrix P(k). However, this method involves a large amount of computation that is not suitable for a real-time implementation. Instead, the PE and the convergence of the parameter can be examined indirectly.

The first step to do this is to introduce a set of n regression models with n parameter vectors of known values, where n is the number of parameters in a parameter vector as:

$$y_i(k) = \phi^T(k)\theta_i, (i=1,2,\ldots,n) \quad (22)$$

Where the regression vector $\phi(k)$ is the same as the original estimation algorithm.

Next, apply the same RLS algorithm in equations (18) and (20) to estimate parameters $\theta_i$ with initial estimations $\hat{\theta}_i(0)$. Since the same $\phi(k)$ is used as the original estimation algorithm, the covariance matrix P(k) is obtained from equation (18) of the original algorithm. The batch form of the estimation algorithm is then:

$$\hat{\theta}_i(k) - \hat{\theta}_i(0) = P(k)(\Sigma_{l=0}^k \lambda^l \phi(k-l)\{y_i(k-l) - \phi^T(k-l)\hat{\theta}_i(0)\}) \quad (23)$$

By substituting equation (22), equation (23) can be re-written as:

$$\{\hat{\theta}_i(k) - \hat{\theta}_i(0)\} = P(k)(\Sigma_{l=0}^k \lambda^l \phi(k-l)\phi^T(k-l)\{\theta_i - \hat{\theta}_i(0)\} \quad (24)$$

For further discussion, define the following matrices.

$$\Theta = [\theta_1 \theta_2 \ldots \theta_n] \quad (25)$$

$$\hat{\Theta}(k) = [\hat{\theta}_1(k)\hat{\theta}_2(k)\ldots\hat{\theta}_n(k)] \quad (26)$$

$$\hat{\Theta}(0) = [\hat{\theta}_1(0)\hat{\theta}_2(0)\ldots\hat{\theta}_n(0)] \quad (27)$$

The model parameters $\theta_i$ and their initial estimates $\hat{\theta}_i(0)$ are chosen so that:

$$\text{rank}([\Theta - \hat{\Theta}(0)]) = n \quad (28)$$

Combining equation (24) for all n models gives:

$$[\hat{\Theta}(k) - \hat{\Theta}(0)] = P(k)(\Sigma_{l=0}^k \lambda^l \phi(k-l)\phi^T(k-l))[\Theta - \hat{\Theta}(0)] \quad (29)$$

The recursive form of equation (29) is written as:

$$\hat{\Theta}(k) = \hat{\Theta}(k-1) + P(k)\phi(k)\phi^T(k)[\Theta - \hat{\Theta}(k-1)]\} \quad (30)$$

Since the model parameters are known, $\hat{\Theta}(k)$ can be compared with $\Theta$. The idea is that the PE can be tested by examining the convergence of the estimated model parameters to the true model parameters. If:

$$\|[\Theta - \hat{\Theta}(k)]\|_F \leq \epsilon \|[\Theta - \hat{\Theta}(0)]\|_F \quad (31)$$

Then:

$$\|\theta_o - \hat{\theta}_o(k)\|_2 \leq \epsilon \|\theta_o - \hat{\theta}_o(0)\|_2 \quad (32)$$

Where $\|A\|_F = \sqrt{\Sigma_{ij} a_{ij}^2}$ is a Frobenius norm of a matrix and $\|\bullet\|_2$ is 2-norm of a vector.

Since $[\Theta - \hat{\Theta}(0)]$ has a full rank, it has an inverse and equation (29) can be re-written as:

$$[\Theta - \hat{\Theta}(k)][\Theta - \hat{\Theta}(0)]^{-1} = [I - P(k)(\Sigma_{l=0}^k \lambda^l \phi(k-l)\phi^T(k-l))] \quad (33)$$

Recall the original parameter estimation algorithm in equation (16) and replace $y_o(k-l)$ with $\phi^T(k-l)\theta_o(k)$ to give:

$$\hat{\theta}_o(k) - \hat{\theta}_o(0) = P(k)(\Sigma_{l=0}^k \lambda^l \phi(k-l)\phi^T(k-l))\{\theta_o - \hat{\theta}_o(0)\} \quad (34)$$

Or in another form:

$$\{\theta_o - \hat{\theta}_o(k)\} = [I - P(k)(\Sigma_{l=0}^k \lambda^l \phi(k-l)]\{\theta_o - \hat{\theta}_o(0)\} \quad (35)$$

Substituting equation (33) into equation (35) gives:

$$\{\theta_o - \hat{\theta}_o(k)\} = [\Theta - \hat{\Theta}(k)][\Theta - \hat{\Theta}(0)]^{-1}\{\theta_o - \hat{\theta}_o(0)\} \quad (36)$$

The condition in equations (31) and (32) implies:

$$\|[\Theta - \hat{\Theta}(k)][\Theta - \hat{\Theta}(0)]^{-1}\|_F \leq \epsilon \quad (37)$$

It follows from equation (37) that:

$$\|\theta_o - \hat{\theta}_o(k)\|_2 \leq \|\{\Theta - \hat{\Theta}(k)\}\Theta^{-1}\|_F \|\theta_o - \hat{\theta}_o(0)\|_2 \leq \epsilon \|\theta_o - \hat{\theta}_o(0)\|_2 \quad (38)$$

The inequality of equation (38) completes the proof.

Since the choice of $[\Theta-\hat{f}(0)]$ is arbitrary as long as the matrix has a full rank, $\Theta=0$ and $\hat{\Theta}(0)=I$ can be chosen. This further simplifies equation (30) to:

$$\hat{\Theta}(k)=\hat{\Theta}(k-1)-P(k)\phi(k)\phi^T(k)\hat{\Theta}(k-1), \hat{\Theta}(0)=I \quad (39)$$

Thus, equations (31) and (32) reduce to, if:

$$\|[\hat{\Theta}(k)]\|_F \leq \epsilon n \quad (40)$$

Then, $$\|\theta_o-\hat{\theta}_o(k)\|_2 \leq \epsilon \|\theta_o-\hat{\theta}_o(0)\| \quad (41)$$

Figure 3:
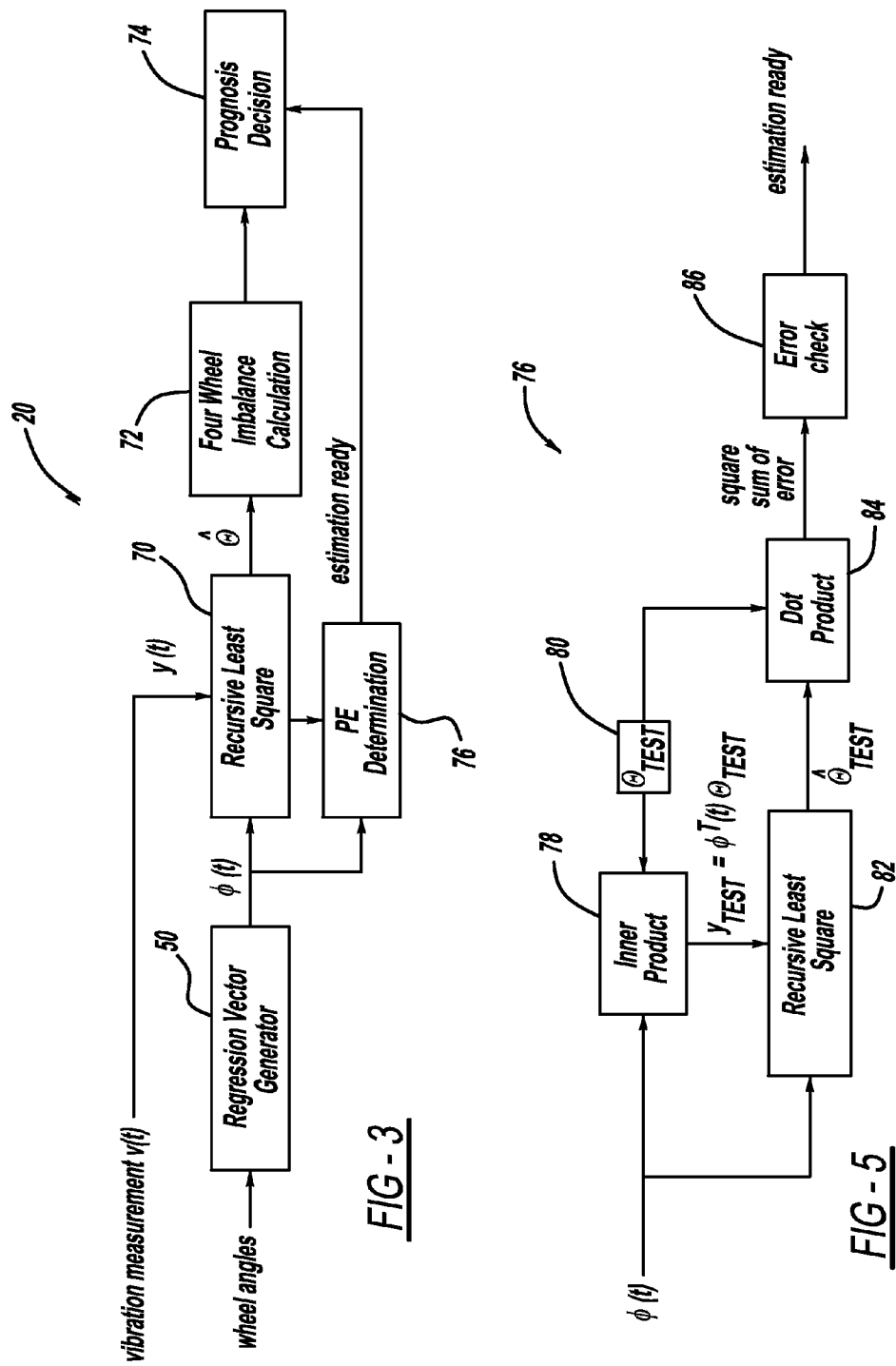
FIG. 3 is a block diagram of the wheel imbalance estimation system shown in FIG. 1.

FIG. 3 is a block diagram of the wheel imbalance estimation system 20 shown in FIG. 1 that illustrates the process for determining the imbalance of the wheels 12, 14, 16 and 18, as discussed above. The four wheel angle signals $\alpha_{RF}$, $\alpha_{LF}$, $\alpha_{RR}$ and $\alpha_{LR}$ from the ABSs 22, 24, 26 and 28, respectively, are sent to a regression vector generator 50 that uses the regression model of equation (10) to calculate the regression vector $\phi(t)$.

Figure 4:
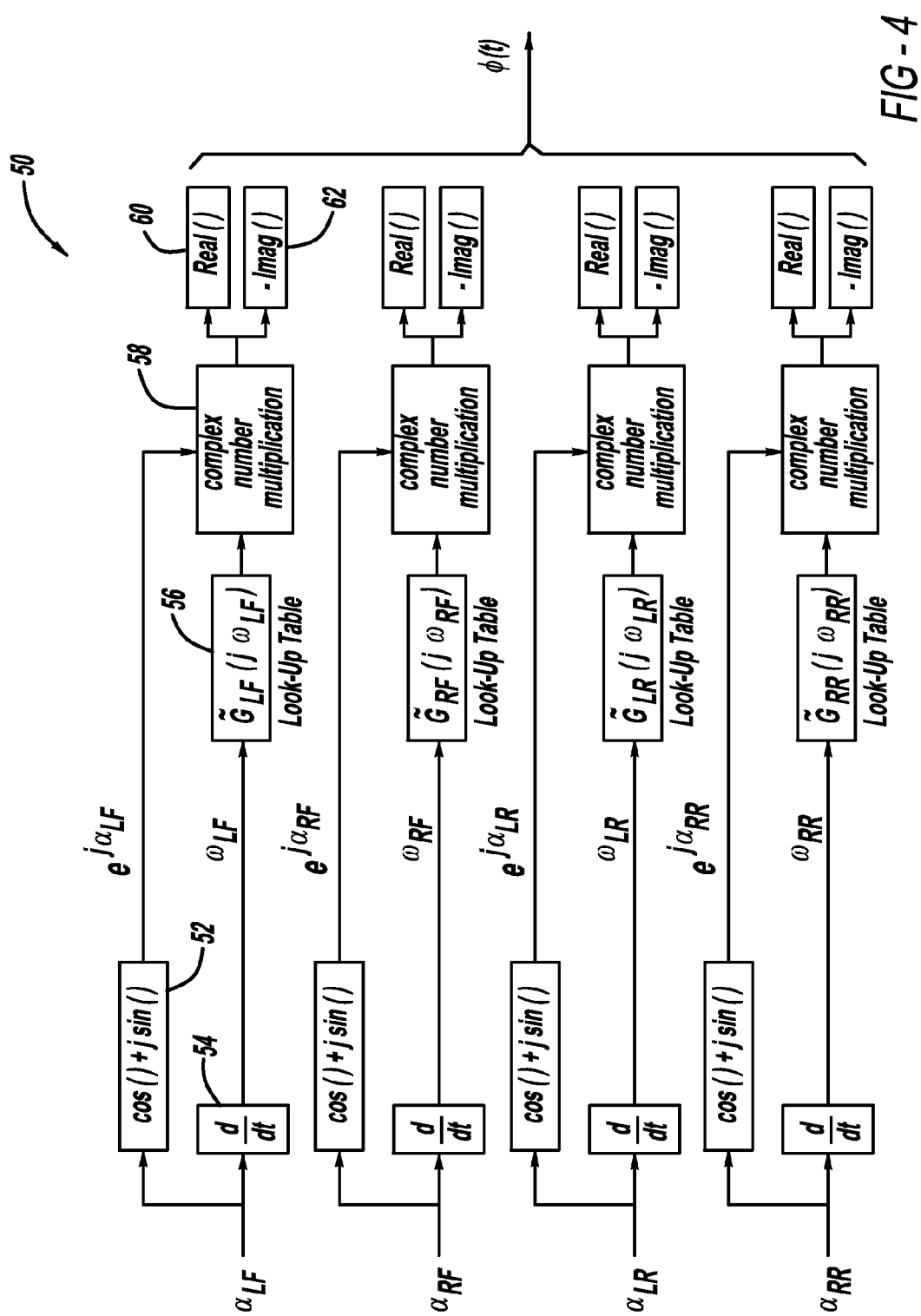
FIG. 4 is a block diagram of a regression vector generator in the estimation system shown in FIG. 3.

FIG. 4 is a block diagram of the regression vector generator 50 showing this operation, where the value $e^{j\alpha}$ is generated at box 52, the value $\omega$ is generated at box 54, the imbalance transfer function $G(j\omega)$ is provided by a look-up table 56 and complex number multiplication is performed at box 58 to generate the real and imaginary parts for each wheel angle $\alpha_{RF}$, $\alpha_{LF}$, $\alpha_{RR}$ and $\alpha_{LR}$ at boxes 60 and 62.

The regression vector $\phi(t)$ is provided to a recursive least squares processor 70 in the system 20 along with the vibration measurement signal v(t) from the accelerometer 34, where y(t)=v(t). The recursive least squares processor 70 calculates a least squares solution to estimate the parameter vector $\hat{\theta}_o(k)$ and generates the co-variance matrix P using equations (14)-(20), as discussed above.

The least squares solution parameter vector estimation $\hat{\theta}_o(k)$ and the co-variance matrix P(k) are then sent to a four wheel imbalance calculation processor 72 where the imbalance magnitude at each wheel 12, 14, 16 and 18 are extracted from the estimation of the parameter vector $\hat{\theta}_o$ using equations (21-1)-(21-4), where the values $\hat{u}_{RF}$, $\hat{u}_{LF}$, $\hat{u}_{RR}$ and $\hat{u}_{LR}$ are the imbalance magnitude of the wheels 12, 14, 16 and 18, respectively. The imbalance magnitude values $\hat{u}_{RF}$, $\hat{u}_{LF}$, $\hat{u}_{RR}$ and $\hat{u}_{LR}$ are then sent to a prognosis decision processor 74 that determines whether any of the imbalance magnitude values $\hat{u}_{RF}$, $\hat{u}_{LF}$, $\hat{u}_{RR}$ and $\hat{u}_{LR}$ are greater than a predetermined threshold, indicating that one or more of the wheels 12, 14, 16 or 18 is out of balance.

As discussed above, it is unknown if the imbalance magnitude values $\hat{u}_{RF}$, $\hat{u}_{LF}$, $\hat{u}_{RR}$ and $\hat{u}_{LR}$ have converged to their true values, thus requiring the persistency of excitation test discussed above. The system 20 includes a PE determination processor 76 that receives the regression vector $\phi(t)$ from the regression vector generator 50. If the persistency estimation test is passed, the PE determination processor 76 outputs an estimation ready flag to the prognosis decision processor 74 indicating that the imbalance magnitudes values $\hat{u}_{RF}$, $\hat{u}_{LF}$, $\hat{u}_{RR}$ and $\hat{u}_{LR}$ are accurate.

FIG. 5 is a block diagram of the PE determination processor 76 showing this operation. The processor 76 runs the estimation algorithm with known test parameters and actual regression vectors to see if the RLS algorithm can estimate the test parameters. The processor 76 receives the regression vector $\phi(t)$ and a test parameter vector $\theta_{test}$ at box 80 and calculates an inner product from these values at box 78. The inner product result, $y_{test}=\phi_T(t)\theta_{test}$, and the regression vector $\phi(t)$ are provided to a recursive least squares processor 82 that generates a test least squares regression vector $\hat{\theta}_{test}$ using equations (18) and (20). The test regression vector $\theta_{test}$ from the box 80 and the test least squares solution regression vector $\hat{\theta}_{test}$ are applied to a dot product box 84 to generate a square sum of errors value. The square sum of errors value is applied to an error check processor 86 to determine whether the estimated parameter $\hat{\theta}_o(k)$ has converged to the true parameter $\theta_o$.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether wheels of a vehicle are out of balance, said method comprising:
    providing wheel angle signals from the wheels of the vehicle;
    providing a vibration measurement signal from a response point on the vehicle;
    generating a regression vector using the wheel angle signals;
    generating an estimated parameter vector using a recursive least squares algorithm, the regression vector and the vibration measurement signal; and
    calculating an imbalance magnitude value of each wheel of the vehicle using the estimated parameter vector.

2. The method according to claim 1 further comprising using a persistency of excitation test to determine whether the estimated parameter vector has converged to a true value to determine whether the calculated imbalance magnitude values are accurate.

3. The method according to claim 2 wherein the persistency of excitation test includes multiplying the regression vector by a test parameter vector to generate an inner product, using the regression vector, the inner product and the recursive least squares algorithm to provide an estimated test parameter vector, generating a square sum of error value using the test parameter vector and the estimated test parameter vector, and determining whether the square sum value is small enough.

4. The method according to claim 1 further comprising generating a co-variance matrix using the recursive least squares algorithm, the regression vector and the vibration measurement signal.

5. The method according to claim 1 further comprising comparing the imbalance magnitude values to a threshold to determine whether the wheels are imbalanced.

6. The method according to claim 1 wherein generating an estimated parameter vector using the recursive least squares algorithm, the regression vector and the vibration measurement signal includes using the equation:

$$\hat{\theta}_o(k)=\hat{\theta}_o(k-1)+P(k)\phi(k)\{y_o(k)-\phi^T(k)\hat{\theta}_o(k-1)\}$$

Where $\hat{\theta}_o(k)$ is the recursive least squares parameter vector, P(k) is a covariance matrix, $\phi(k)$ is the regression vector and $y_o$ is the vibration measurement.

7. The method according to claim 1 wherein determining the imbalance magnitude values includes using the equations:

$$|\hat{u}_{LF}|=\sqrt{\hat{a}_{LF}^2+\hat{b}_{LF}^2}$$

$$|\hat{u}_{RF}|=\sqrt{\hat{a}_{RF}^2+\hat{b}_{RF}^2}$$

$$|\hat{u}_{LR}|=\sqrt{\hat{a}_{LR}^2+\hat{b}_{LR}^2}$$

$$|\hat{u}_{RR}|=\sqrt{\hat{a}_{RR}^2+\hat{b}_{RR}^2}$$

Where $\hat{u}$ is the imbalance magnitude for a left front (LF), right front (RF), left rear (LR) and right rear (RR), and $\hat{a}$ and $\hat{b}$ are measured vibration parameters.

8. The method according to claim 1 wherein the response point is on a steering column of the vehicle.

9. The method according to claim 7 wherein generating a vibration measurement includes using an accelerometer.

10. The method according to claim 1 wherein generating a vibration measurement includes using a steering wheel torque sensor.

11. The method according to claim 1 wherein providing wheel angle signals from the wheels of the vehicle includes providing wheel angle signals from automatic braking systems.

12. A method for determining whether wheels of a vehicle are out of balance, said method comprising:
   providing wheel angle signals from the wheels of the vehicle;
   providing a vibration measurement signal from an accelerometer on a steering column on the vehicle;
   generating a regression vector using the wheel angle signals;
   generating an estimated parameter vector and a co-variance matrix using a recursive least squares algorithm, the regression vector and the vibration measurement signal;
   calculating an imbalance magnitude value of each wheel of the vehicle using the estimated parameter vector; and
   using a persistency of excitation test to determine whether the estimated parameter vector has converged to a true value to determine whether the calculated imbalance magnitude values are accurate.

13. The method according to claim 12 wherein the persistency of excitation test includes multiplying the regression vector by a test parameter vector to generate an inner product, using the regression vector, the inner product and the recursive least squares algorithm to provide an estimated test parameter vector, generating a square sum of error value using the test parameter vector and the estimated test parameter vector, and determining whether the square sum value is small enough.

14. The method according to claim 12 wherein generating an estimated parameter vector using the recursive least squares algorithm, the regression vector and the vibration measurement signal includes using the equation:

$$\hat{\theta}_o(k) = \hat{\theta}_o(k-1) + P(k)\phi(k)\{y_o(k) - \phi^T(k)\hat{\theta}_o(k-1)\}$$

Where $\hat{\theta}_o(k)$ is the recursive least squares parameter vector, $P(k)$ is the covariance matrix, $\phi(k)$ is the regression vector and $y_o$ is the vibration measurement.

15. The method according to claim 12 wherein determining the imbalance magnitude values includes using the equations:

$$|\hat{u}_{LF}| = \sqrt{\hat{a}_{LF}^2 + \hat{b}_{LF}^2}$$

$$|\hat{u}_{RF}| = \sqrt{\hat{a}_{RF}^2 + \hat{b}_{RF}^2}$$

$$|\hat{u}_{LR}| = \sqrt{\hat{a}_{LR}^2 + \hat{b}_{LR}^2}$$

$$|\hat{u}_{RR}| = \sqrt{\hat{a}_{RR}^2 + \hat{b}_{RR}^2}$$

Where $\hat{u}$ is the imbalance magnitude for a left front (LF), right front (RF), left rear (LR) and right rear (RR), and $\hat{a}$ and $\hat{b}$ are measured vibration parameters.

16. A system for determining whether wheels of a vehicle are out of balance, said system comprising:
   means for providing wheel angle signals from the wheels of the vehicle;
   means for providing a vibration measurement signal from a response point on the vehicle;
   means for generating a regression vector using the wheel angle signals;
   means for generating an estimated parameter vector using a recursive least squares algorithm, the regression vector and the vibration measurement signal; and
   means for calculating an imbalance magnitude value of each wheel of the vehicle using the estimated parameter vector.

17. The system according to claim 16 further comprising means for using a persistency of excitation test to determine whether the estimated parameter vector has converged to a true value to determine whether the calculated imbalance magnitude values are accurate.

18. The system according to claim 17 wherein the means for using a persistency of excitation test multiplies the regression vector by a test parameter vector to generate an inner product, uses the regression vector, the inner product and the recursive least squares algorithm to provide an estimated test parameter vector, generates a square sum of error value using the test parameter vector and the estimated test parameter vector, and determines whether the square sum value is small enough.

19. The system according to claim 16 further comprising means for generating a co-variance matrix using the recursive least squares algorithm, the regression vector and the vibration measurement signal.

20. The system according to claim 16 wherein the means for generating an estimated parameter vector using the recursive least squares algorithm, the regression vector and the vibration measurement signal includes uses the equation:

$$\hat{\theta}_o(k) = \hat{\theta}_o(k-1) + P(k)\phi(k)\{y_o(k) - \phi^T(k)\hat{\theta}_o(k-1)\}$$

Where $\hat{\theta}_o(k)$ is the recursive least squares parameter vector, $P(k)$ is a covariance matrix, $\phi(k)$ is the regression vector and $y_o$ is the vibration measurement.

* * * * *